…

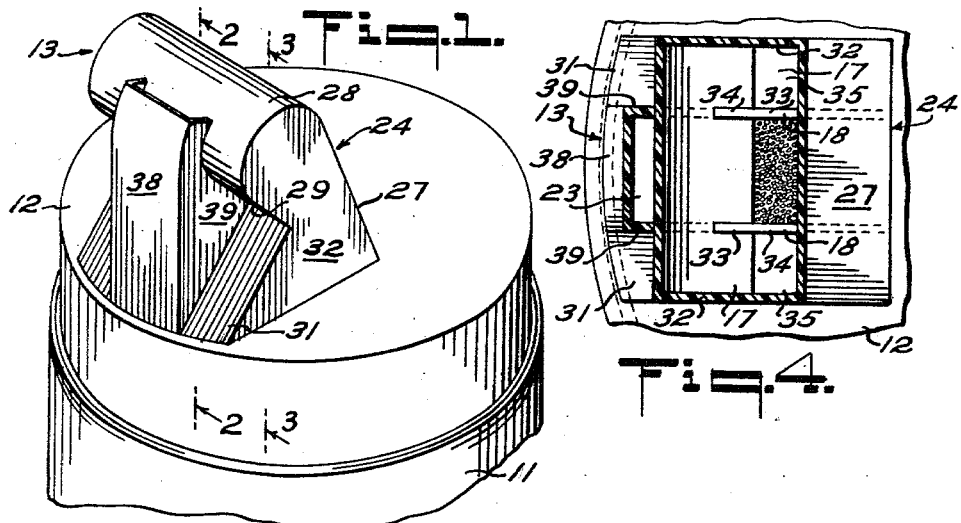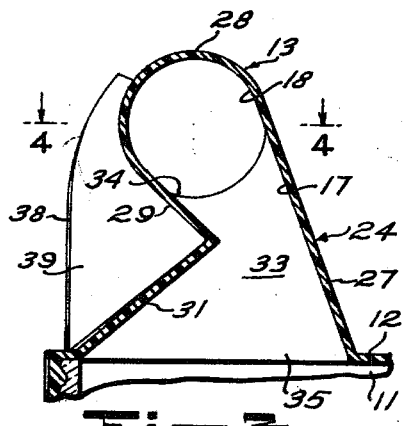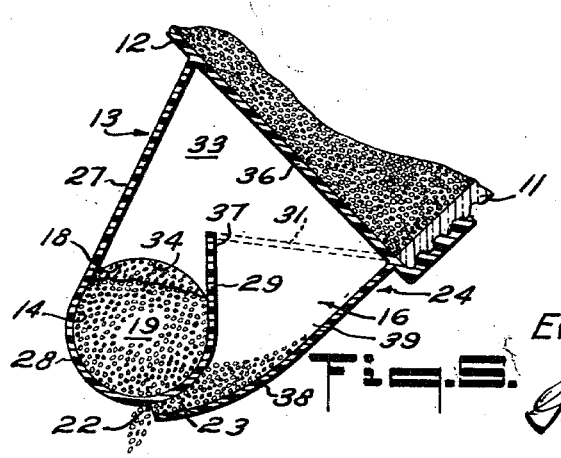

United States Patent Office 3,195,789
Patented July 20, 1965

3,195,789
MEASURING AND DISPENSING DEVICE
Ewald Robert Hoffman, Berkeley, Calif.
(6004 Chabolyn Terrace, Oakland, Calif.)
Filed Nov. 29, 1963, Ser. No. 326,757
5 Claims. (Cl. 222—455)

The present invention relates to devices for measuring a predetermined quantity of material and dispensing the measured quantity of material, and is particularly directed to a device of this type which is adapted for use with sugar or the like and which is arranged to accurately measure a teaspoonful or other predetermined quantity of the material for subsequent dispensing while a previously measured quantity of material is being dispensed.

It is frequently desirable that means be provided with containers of material in pulverulent, granular, powdered, or equivalent form to facilitate dispensing of the material in pre-measured quantities. In restaurants, for example, measuring and dispensing devices may be employed with sugar containers to automatically measure and dispense a teaspoonful of sugar in response to tipping of the container. In such devices it is necessary that the quantity of material dispensed be measured with accuracy. Moreover, it is desirable, among other things, that unintentional spilling of the material be prevented and that the device be capable of dispensing the last bit of material in the container.

It is an object of the present invention to provide a gravity operated measuring and dispensing device which is arranged to accumulate a predetermined quantity of material in a measuring reservoir in response to tilting of a container of material with which the device is employed, to deliver the accumulated material to a dispensing chute upon return of the container to upright position, and to discharge the material from the dispensing chute in response to subsequent tilting of the container while another charge of material is being accumulated in the measuring reservoir for subsequent dispensing.

Another object of the invention is the provision of a device of the class described which may be provided on the top of a container so that even the last bit of material in the container will be delivered to the measuring reservoir upon tilting of the container and may be dispensed.

Still another object of the invention is to provide a measuring and dispensing device of the class described having a large filling area communicated with the measuring reservoir and restricted outlet flow path through the dispensing chute to insure complete and accurate filling of the reservoir during the time required to dispense a previously measured quantity of material from the dispensing chute.

It is yet another object of the invention to provide a measuring and dispensing device of the class described having an upwardly curved dispensing chute which permits discharge of material only when the device is in tilted dispensing position, thereby preventing accidental spilling of the material.

A further object of the invention is to provide a measuring device of the class described which is simple and low cost in construction.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a perscpetive view of the measuring and dispensing device of the present invention provided as a part of the lid of a sugar container or the like.

FIGURE 2 is a sectional view taken at line 2—2 of FIGURE 1 through a central portion of the device, illustrating particularly the measuring reservoir and dispensing chute of the device.

FIGURE 3 is a sectional view taken at line 3—3 of FIGURE 1 through a portion of the device offset from the central portion thereof, illustrating particularly the filling area of the device.

FIGURE 4 is a sectional view taken at line 4—4 of FIGURE 3.

FIGURE 5 is a sectional view similar to FIGURE 2, but with the device in tilted dispensing position.

Referring to FIGURE 1 of the drawing, container 11, of sugar or equivalent material of pulverulent, granular, powdered, etc., form is provided with a lid 12 including a measuring and dispensing device 13 in accordance with the present invention. The device 13 is arranged to measure a predetermined quantity of material from the container and dispense a previously measured charge of material in response to tilting of the container and device to a substantially inverted position as shown in FIGURE 5. In this regard the device encloses within a central upper portion thereof a measuring reservoir 14 opening at its lower end into the base region of an upwardly extending dispensing chute 16. The device also encloses filling areas or passages 17 on opposite sides of the reservoir and base region of the chute. The passages 17 are communicated at their lower ends with the interior of the container 11 and are communicated at their upper ends with the reservoir through lateral openings 18. Thus when the container and device are tilted to the position illustrated in FIGURE 5, the material flows by gravity from the container into the passages 17 with a portion of the material entering the reservoir 14 through openings 18 and accumulating at the upper end of the reservoir (lower end as viewed in FIGURE 5) as a measured charge 19. When the container and device are returned to upright position, the measured charge 19 is deposited by gravity in the base region of the dispensing chute 16 as indicated at 21 in FIGURE 2. At the same time material in the passages 17 flows back into the container. When the container and device are again tilted, the accumulation of material 21 is discharged from the dispensing chute 16, as indicated at 22, while another measured charge 19 accumulates in the reservoir 14 for subsequent dispensing. It is particularly important to note that in order to insure accurate measurement of each charge accumulated in the reservoir, the filling of the reservoir must proceed to completion during the time required to discharge the previously measured charge from the dispensing chute. The foregoing is herein preferably accomplished by the provision of passages 17 of relatively large area and openings 18 of large size. In addition, the flow path through the dispensing chute 16 is constricted as indicated at 23. Thus, material is able to flow freely and rapidly through passages 17 and openings 18 to the reservoir while the constriction 23 limits the rate at which material is discharged from the dispensing chute. Consequently, complete filling of the reservoir prior to completion of discharge from the dispensing chute is assured.

Considering now the measuring and dispensing device 13 outlined above in greater detail as to preferred structure, it is to be noted that the device is preferably formed integrally with the lid 12 from plastic or the like. The device 13 includes a hollow closure member 24 which is upstanding from the lid and has a base portion of substantially rectangular cross section. More particularly the base portion departs from an exact rectangle in that one side is slightly arcuate to conform to the curved periphery of the lid and to be substantially flush therewith. Member 24 includes a rectangular end wall 27 which is upwardly inclined from the top of the lid and merges at its upper end with a substantially semi-cylindrical top portion 28. Top portion 28 extends arcuately from end wall 27 to re-entrantly terminate in a rectangular intermediate wall portion 29 inclined in the direction of the base of end wall 27. Intermediate wall portion 29 terminates short of the end wall 27 in an oppositely inclined wall portion 31 which extends to the top of the lid at the periphery thereof and defines the arcuate portion of the base of the members. Side walls 32 extend upwardly from the top of the lid in conformed closing relation to the side edges of end wall 27, top portion 28, and wall portions 29, 31. In addition, a pair of partitions 33 are provided between the end wall 27 and wall portions 29, 31 in inwardly spaced parallel relation to the side walls 32 and in spaced-apart parallelism to each other. The partitions extend upwardly from the top of the lid and are provided with substantially semi-circular upper edges 34 which are disposed in opposed concentric relation to the arcuate interior wall surface of top portion 28. A pair of spaced apart rectangular apertures 35 are provided through the top of the lid which respectively laterally bridge one side wall and the adjacent partition, and the other side wall and adjacent partition. The apertures extend between the end wall 27 and wall portion 31. The regions defined between the respective partitions 33 and side walls 32, top portion 28, wall 17, and wall portions 29, 31 thus comprise the passages 17, while the region defined between the partitions and top portion comprises the reservoir 14. Similarly, the circular apertures defined by the upper edges 34 of the partitions and the interior wall surface of top portion 28 comprise the openings 18 communicating the passages 17 with the upper end of reservoir 14.

To complete the preferred structure of the measuring and dispensing device 13, the dispensing chute 16 is provided in the manner best shown in FIGURES 2 and 5. In this regard it will be noted that a base wall portion 36 of the lid between apertures 35 extends between the partitions 33 and wall 27 and wall portion 31 in closing relation to the region marginally defined thereby. In addition, a rectangular aperture 37 is provided in wall portion 31 between the partitions 33, such aperture extending upwardly from the base edge of wall portion 31 to its intersection with wall portion 29. A leading wall portion 38 then extends vertically upward from the base wall 36 in bridging relation to the base of aperture 37. Leading wall portion 38 is curved at its upper end toward top portion 28 to terminate in close spaced relation thereto, thus defining the constriction 23. In addition, the lower end of wall portion 38 is substantially flush with the peripheral wall of the lid. Chute side walls 39 extend between the side edges of wall portion 38 and wall portions 31, 29 and top portion 28. The chute side walls are disposed along the side edges of aperture 37 and are coextensive with the partitions 33. Thus, the base region of the chute is in part communicably disposed subjacent the reservoir 14 and in part subjacent the exterior surface of wall portion 29. Each measured charge accumulated in the reservoir is deposited upon horizontal wall 36, i.e., in the base region of the chute, when the device 13 and container are placed in upright position. When the device and container are tilted forwardly and downwardly, the charge hence flows through the aperture 37 and the portion of the chute defined by leading wall portion 38, wall portion 29 and chute side walls 39.

It will be appreciated that by virtue of the body member 24 being positioned atop the lid 12 and the lid apertures 35 which communicate the interior of the container 11 with passages 17 being closely spaced to the lid periphery, the last bit of contents of the container is introduced to the device through passages 17. Moreover, it should be noted that by virtue of the configuration of the body member 24 and the relationship of the reservoir 14 thereto in the preferred structure of the device 13, complete filling of the reservoir occurs even when the device is tilted to positions departing somewhat from that depicted in FIGURE 5.

What is claimed is:

1. A measuring and dispensing device of the class described comprising a hollow member having an open lower end and closed upper end, means including a pair of parallel spaced flat partitions within a central region of said member extending upwardly from said lower end to positions downwardly spaced from said closed upper end and defining a measuring reservoir in a central upper portion of said member between said partitions and passages within said member on opposite sides of said reservoir, said passages extending upwardly from the open lower end of said member and laterally communicating with said reservoir through areas of communication defined between said closed upper end and the upper end edge portions of said partitions at said positions downwardly spaced from said closed upper end, and means defining a dispensing chute extending upwardly from the lower end of said member and having a base region in subjacent communication with said reservoir.

2. A device as defined by claim 1, further defined by said passages each having a relatively large cross sectional area and said area of communication being each relatively large, and said chute having a constrcition in the flow path thereof.

3. A device of the class described comprising a lid, a hollow member upstanding from said lid, a pair of partitions disposed in spaced-apart parallel relation within a central region of said member and extending upwardly from the lid to positions spaced from the upper end of said member, said partitions defining with the interior of said member and with each other a pair of filling passages, wall means defining a measuring reservoir centrally disposed within the upper region of said member, said filling passages being on opposite sides of and in lateral communication with said reservoir, said lid having a pair of spaced apart apertures in communication with said passages and a base wall portion between said apertures and bridging said partitions in closing relation thereto, and wall structure defining with the exterior walls of said member a dispensing chute extending upwardly from one end of said base wall portion and communicating with the region between said partitions at the lower ends thereof.

4. A device of the class described comprising a lid having a pair of spaced apart apertures with a bridging wall portion therebetween, a hollow member defined by a rectangular wall upwardly inclined from said lid at the inner ends of said apertures and merging at its upper end with a generally semi-cylindrical top portion in turn re-entrantly merging with an intermediate wall portion downwardly inclined towards the base of said wall and terminating short thereof in an oppositely inclined wall portion terminating at said lid along the outer ends of said apertures and conformed side walls extending upwardly from the outer side edges of the respective apertures in closing relation to the opposite side edges of said wall and said top portion and said wall portions, a pair of partitions disposed in parallel spaced relation to said side walls and in spaced-apart parallelism to each other, said partitions respectively extending between said inclined wall and said wall portions along the inner side edges of said apertures and having arcuate upper ends in opposed concentric relation to said semi-cylindrical top portion to define generally circular openings therewith, said bridging wall portion extending between said partitions in closing relation thereto, a leading dispensing chute wall extending vertically upward from said bridging wall portion in spaced relation to said intermediate wall portion and to said oppositely inclined wall portion and curving at its upper end towards said top portion into close spaced relation thereto, said oppositely inclined wall portion having an aperture between said partitions, and chute side walls extending between the side edges of said leading chute wall and said intermediate and oppositely inclined wall portions and said top portion in closing relation thereto.

5. A measuring and dispensing device for a container of granular material or the like comprising a circular lid adapted for attachment to the top of said container, said lid having a pair of spaced apart generally rectangular apertures, said apertures extending to substantially the periphery of the lid, a hollow member defined by a rectangular wall upwardly inclined from the inner edges of said apertures merging at its upper end with a generally semi-cylindrical top portion in turn re-entrantly merging with an intermediate wall portion downwardly inclined towards the base of said wall and terminating short thereof in an oppositely inclined wall portion terminating arcuately at the lid periphery along the outer edges of said apertures and conformed side walls extending upwardly from the outer side edges of said apertures in closing relation to the opposite side edges of said wall and said top portion and said wall portions, a pair of partitions disposed in parallel spaced relation to said side walls and in spaced-apart parallelism to each other, said partitions extending between said wall and said wall portions along the inner side edges of said apertures, and having arcuate upper ends in opposed concentric relation to said semi-cylindrical top portion to define cylindrical openings therewith, a leading dispensing chute wall having a lower end substantially flush with the peripheral wall of said lid extending vertically upward therefrom in spaced relation to said wall portions and curving at its upper end towards said top portion into close spaced relation thereto, said oppositely inclined wall portion having an aperture between said partitions, and chute side walls extending between the side edges of said leading chute wall and said wall portions and said top portion in closing relation thereto.

References Cited by the Examiner
UNITED STATES PATENTS
1,962,562   6/34   Hemman _____ 222—455 X RAPHAEL M. LUPO, *Primary Examiner.*
LOUIS J. DEMBO, *Examiner.*